United States Patent
Parrein et al.

(10) Patent No.: US 10,492,380 B2
(45) Date of Patent: Dec. 3, 2019

(54) FIRE RETARDANT DARKENING SCREEN

(71) Applicant: LOW & BONAR, Zele (BE)

(72) Inventors: Tim Parrein, Ghent (BE); Ives Swennen, Hansbeke (BE)

(73) Assignee: LOW & BONAR, Zele (BE)

( * ) Notice: Subject to any disclaimer, the term of this patent is extended or adjusted under 35 U.S.C. 154(b) by 465 days.

(21) Appl. No.: 15/314,455

(22) PCT Filed: May 20, 2015

(86) PCT No.: PCT/EP2015/061063
§ 371 (c)(1),
(2) Date: Nov. 28, 2016

(87) PCT Pub. No.: WO2015/181007
PCT Pub. Date: Dec. 3, 2015

(65) Prior Publication Data
US 2017/0238476 A1 Aug. 24, 2017

(30) Foreign Application Priority Data

May 28, 2014 (EP) .................................... 14170367
Jun. 2, 2014 (EP) .................................... 14170730

(51) Int. Cl.
*A01G 9/14* (2006.01)
*C08K 5/3492* (2006.01)
*C08K 5/5317* (2006.01)
*C09K 21/10* (2006.01)
*C09K 21/12* (2006.01)

(52) U.S. Cl.
CPC .......... *A01G 9/1438* (2013.01); *C08K 5/3492* (2013.01); *C08K 5/5317* (2013.01); *C09K 21/10* (2013.01); *C09K 21/12* (2013.01)

(58) Field of Classification Search
CPC .................................................. A01G 9/1438

USPC .......................................................... 428/105
See application file for complete search history.

(56) References Cited

U.S. PATENT DOCUMENTS

2014/0193653 A1 * 7/2014 Combs ....................... C09J 5/00
428/535
2014/0288217 A1 9/2014 Hatanaka et al.

FOREIGN PATENT DOCUMENTS

| EP | 0 537 837 A1 | 4/1993 | |
|---|---|---|---|
| EP | 0 696 884 B1 | 6/1999 | |
| EP | 1 825 747 A1 | 8/2007 | |
| EP | 2 457 436 A1 | 5/2012 | |
| JP | 2004-238568 A | 8/2004 | |
| WO | 94/22288 A1 | 10/1994 | |
| WO | 2011/096882 A1 | 8/2011 | |
| WO | 2012/079243 A1 | 6/2012 | |
| WO | 2013/041524 A1 | 3/2013 | |
| WO | 2013/084725 A1 | 6/2013 | |
| WO | 2013/117696 A1 | 8/2013 | |
| WO | WO-2013117696 A1 * | 8/2013 | ............. A01G 9/227 |
| WO | 2013/134083 A1 | 9/2013 | |

OTHER PUBLICATIONS

Aug. 19, 2015 International Search Report issued in International Patent Application No. PCT/EP2015/061063.
Aug. 19, 2015 Written Opinion of the International Searching Authority issued in International Patent Application No. PCT/EP2015/061063.

* cited by examiner

*Primary Examiner* — Brent T O'Hern
(74) *Attorney, Agent, or Firm* — Oliff PLC

(57) ABSTRACT

A fire retardant darkening screen for use in greenhouses is provided, the screen including a top fabric and a bottom fabric. The top fabric includes halogen-containing polymeric strips laminated with a light-reflective film or foil. The bottom fabric includes polyolefin tapes, preferably high density polyethylene tapes, the polyolefin tapes including a synergistic fire resistance composition.

14 Claims, No Drawings

FIRE RETARDANT DARKENING SCREEN

BACKGROUND

The present invention pertains to screens which provide shade and/or save energy. More in particular, the invention pertains to fire retardant, drapable screens for use in conservatories or greenhouses, mainly screens that partially consist of thin and flexible plastic strips that can be converted into a large, flat and pliable product, such as a fabric, in particular by weaving, using one or more yarns, if necessary.

Such screens are frequently used for protecting plants, in the open field or indoors in greenhouses, for controlling the incoming and outgoing radiation energy to a certain extent, so that the plants are protected against too strong sunlight and against too high or too low temperatures. Said screens, also called curtains, are spread vertically and/or horizontally over very large areas, with areas of 30,000 m$^2$ not being exceptional. Because the plants to be protected may represent a great value, protecting them serves a major economic purpose. Usually, opening and closing the screens is done by electric means, with the screens being moved to the active or inactive position by means of motors.

In such environments a fire may start, for example in the case of the electric defects, during repair work involving grinding or welding, or of vehicles moving under the screen in the greenhouse. It has been established that such fires can spread very quickly over large areas via the screens. The fires constitute a danger to personnel present in the greenhouses, and can be destructive to the greenhouse itself and also to its contents.

Such screens for greenhouses are disclosed, for example in EP 0 696 884 B1, which discloses a screen comprising flexible strips consisting of a halogen- or phosphorus-containing plastic film, preferably made of PVC, PVDC, PCTFE, PVF, FEP, PTFE, E/TFE or PETP, which also comprises a UV stabiliser, at least partially laminated with a metal film and connected into a continuous product by crocheting or weaving, using a yarn system, said yarn system at least partially consisting of a flame retardant material, such as modacryl yarns. The strips as well as the yarn system are at least partially made of materials which are flame retardant or not easily flammable.

WO 2011/096882 A1 discloses a greenhouse screen comprising strips that are connected with a yarn system by means of hosiery, knitting, warp-knitting or weaving process, wherein the screen comprises multilayer polyester strips having a thickness less than 60 µm and wherein at least one layer of the multilayer polyester strips is white and at least one layer is black.

WO 2013/117696 A1 discloses a flame retardant screen comprising strips having a thickness of at most 100 µm, which are connected by flame retardant yarns. Hardly any flame retardants are incorporated in the strips which are made of a plastic having a limiting oxygen index of at least 18%, contain at most 0.15 wt. % of phosphorus, contain at most 900 ppm by weight of chlorine, fluorine or bromine, and contain at most 1.0 wt. % of sulfur. The only mentioned type of polymer of the strips is polyester.

EP 2 457 436 A1 discloses a shading screen made from fire resistant halogen-free polymer films, optionally laminated with a metal film, wherein the halogen-free polymer is polycarbonate, polycarbonate-polysiloxane block-copolymer or a blend of polycarbonate and polysiloxane.

XLS OBSCURA REVOLUX A/B+B/B, as sold by AB Ludvig Svensson, comprises two separate fabrics, wherein the top fabric comprises, in the machine direction, tapes of PVC laminated with Aluminum foil warp-knitted together with transparent modacryl yarns and with fire retardant polyester yarns. The lower fabric comprises, in the machine direction, tapes black polyester tapes warp-knitted together with fire retardant polyester yarns.

Regarding the fire properties of plastic objects, reference is usually made to the fire tests of DIN 4102, part 2 and part 1, or to the fire test of UL 94. Because said tests do not correspond very well to the actual fire behaviour of screen materials used in greenhouse farming, the new technical agreement NTA 8825:2010 was developed, which is specifically aimed at the fire behaviour of screen materials for use in greenhouses. The requirements in accordance with said agreement are being imposed in the most important markets in Western Europe. However, it has proven to be very difficult to meet the NTA 8825:2010 fire test requirements.

It is an object of the invention to provide screens for greenhouses that comply with the NTA 8825:2010 fire test requirements.

This and other objects are achieved by the screen described herein.

SUMMARY

Surprisingly, it has been found that a screen comprising a top fabric and a bottom fabric, wherein the top fabric comprises halogen-containing polymeric strips and a light-reflective film or foil laminated to at least a portion of the halogen-containing polymeric strips and wherein the bottom fabric comprises polyolefin tapes, the polyolefin tapes comprising a synergistic fire resistance composition comprising a mixture of at least two chemical compounds, each chemical compound being selected from a phosphonate compound, a diphosphonate compound, or an alkyl- or arylphosphonic acid, and at least one 1,3,5-triazine compound, fulfils the requirements of the NTA 8825:2010 fire test.

DETAILED DESCRIPTION

In particular, the fabric used as bottom fabric in darkening screens, comprising polyolefin tapes comprising a synergistic fire resistance composition comprising a mixture of at least two chemical compounds, each chemical compound being selected from a phosphonate compound, a di-phosphonate compound and/or an alkyl- or arylphosphonic acid, and at least one 1,3,5-triazine compound, enables that the darkening screen to fulfil the requirements of the NTA 8825:2010 fire test.

The top fabric of the screen will, during normal use in a greenhouse, be facing the roof of the greenhouse, while the bottom fabric will be facing the interior of the greenhouse, in particular the plants growing in the greenhouse.

The halogen-containing polymeric strips may be made from polyvinylchloride (PVC), polyvinylidene-chloride (PVDC), polychlorotrifluoroethylene (PCTFE), polyvinylfluoride (PVF), fluorinated ethylene propylene (FEP), which is a copolymer of hexafluoropropylene and tetrafluoroethylene, polytetrafluoroethylene (PTFE), ethylene-tetrafluoroethylene (E/TFE), which is a copolymer of tetrafluoroethylene and ethylene. Preferably, the halogen-containing polymeric strips are made of PVC to further improve the fire retardancy of the screen.

The halogen-containing polymeric strips may comprise up 10 wt. %, preferably up to 5 wt. %, of commonly known additives, such as for example processing aids or UV-resistant additives.

At least a portion of the halogen-containing polymeric strips in the top fabric comprises a light-reflective film or foil laminated to the halogen-containing polymeric strips. The light-reflective film or foil may be a low emitting metal foil, preferably an aluminum foil. The light-reflective film or foil preferably has a thickness of at most 250 µm, more preferably at most 100 µm, most preferably at most 50 µm, to ensure that the top fabric remains flexible enough to allow opening of the screen.

The halogen-containing polymeric strips may have a thickness of 250 µm or less, preferably 200 µm or less, more preferably 150 µm or less, most preferably 100 µm or less, to ensure that the top fabric remains sufficiently flexible. Preferably, the halogen-containing polymeric strips has a thickness of 50 µm or more, preferably 60 µm or more, more preferably 75 µm or more, to ensure good processing of the strips into the top fabric.

The halogen-containing polymeric strips may have a width of at least 0.10 cm, preferably at least 0.15 cm, more preferably at least 0.20 cm, to obtain sufficient surface coverage in the top fabric under economic conditions. Preferably, the halogen-containing polymeric strips have a width of at most 2 cm, preferably at most 1.5 cm, preferably at most 1 cm, more preferably at most 0.5 cm, most preferably at most 0.3 cm, to ensure that the top fabric remains flexible enough to allow easy installation of the screen.

The top fabric of the screen may comprise the light reflective film or foil laminated to at least 25% of the halogen-containing polymeric strips, preferably to at least 50%, preferably to at least 75%, more preferably to at least 90%, even more preferably to at least 95%, most preferably to 100%, of the halogen-containing polymeric strips to provide further improved reflective performance and/or to further improve the fire retardancy of the screen. Preferably, the light reflection of the top fabric is 95% or more, more preferably 98% or more, most preferably 99% or more.

Preferably, all of the halogen-containing polymeric strips comprising a light-reflective film or foil laminated to the halogen-containing polymeric strip are arranged in the top fabric such that all the light-reflective films or foils are located on the same surface of the top fabric, in particular on the surface facing the roof of the greenhouse in normal use in a greenhouse. The halogen-containing polymeric layer of the laminated strips will, in normal use in a greenhouse, be facing towards the bottom fabric of the screen.

The light reflective film or foil may be laminated to the halogen-containing polymeric strips by any known suitable means, including co-extrusion, extrusion of the halogen-containing polymer onto the light reflective film or foil, or by application of a glue at the interface of the light reflective film or foil and the halogen-containing polymeric strips. Preferably, the light reflective film or foil is laminated to the halogen-containing polymeric strips by application of a glue.

The halogen-containing polymeric strips comprised in the top fabric of the screen are preferably arranged in the machine direction in the top fabric, preferably parallel to each other, to facilitate installation of the screen into the greenhouse and/or to allow opening and closing of the screen to allow sunlight to enter the greenhouse if desired.

Preferably, the lower surface of the top fabric, i.e., the surface of the top fabric facing towards the bottom fabric of the screen, has a black appearance, or colour. The halogen-containing polymeric strips may comprise a black pigment such as for example carbon black, preferably in amount of 1 wt. % to 10 wt. %, more preferably in amount of 2 wt. % to 5 wt. %, based on the total weight of the halogen-containing polymeric strips, such that the lower surface of the top fabric has a black appearance. Alternatively, the glue applied at the interface between the light reflective film or foil and the halogen-containing polymeric strips, to laminate the light reflective film or foil and the halogen-containing polymeric strips may comprise a black pigment, such as for example carbon black, preferably in amount of 1 wt. % to 10 wt. %, more preferably in amount of 2 wt. % to 5 wt. %, such that the lower surface of the top fabric has a black appearance.

The top fabric of the screen may further comprise yarns arranged in the machine direction of the top fabric to further facilitate installation of the screen into the greenhouse and/or to allow opening and closing of the screen to allow sunlight to enter the greenhouse if desired.

The linear density (expressed in the unit tex, i.e., the weight of a yarn in gram per 1000 m length) of the yarns arranged in the machine direction in the top fabric may in principle vary widely. The linear density of the yarns arranged in the machine direction in the top fabric of the screen may be at least 10 tex, preferably at least 20 tex, more preferably at least 40 tex, most preferably at least 50 tex, to facilitate installation of the screen into the greenhouse and/or to allow opening and closing of the screen to allow sunlight to enter the greenhouse if desired. Preferably, the linear density of the yarns arranged in the machine direction in the top fabric of the screen is at most 200 tex, preferably at most 100 tex, more preferably at most 75 tex, to ensure that the top fabric remains sufficiently flexible.

Preferably, the yarns arranged in the machine direction in the top fabric are arranged in alternating relationship with the halogen-containing polymeric strips arranged in the machine direction in the top fabric.

Preferably, the yarns arranged in the machine direction in the top fabric are modacryl yarns to allow transfer of moisture through the top fabric of the screen and to further improve the fire retardancy of the screen.

The top fabric of the screen may further comprise yarns arranged in the cross machine direction of the top fabric to connect the halogen-containing polymeric strips in the machine direction of the top fabric and optionally the yarns arranged in the machine direction of the top fabric to each other.

Preferably, the yarns arranged in the cross machine direction of the top fabric and the halogen-containing polymeric strips, preferably arranged in the machine direction, and optionally the yarns arranged in the machine direction, are woven into a woven fabric forming the top fabric of the screen.

The weave pattern of the top fabric may be selected by the person skilled in the art. Preferably, the weave pattern of the top fabric is a plain 1/1 weave pattern.

Preferably, the woven fabric forming the top fabric has a weave construction such that an essentially full surface is obtained by the top fabric to reduce light transmission through the screen. Preferably, the light transmission through the top fabric is 5% or less, preferably 2% or less, more preferably 1% or less, more preferably 0.5% or less, most preferably 0.1% or less.

Preferably, the halogen-containing polymeric strips, preferably arranged in the machine direction in the top fabric of the screen, and optionally the yarns arranged in the machine direction in the top fabric, are arranged in direct contact with the neighbouring halogen-containing polymeric strips and/or neighbouring yarns to reduce the amount of light penetrating through the screen.

The linear density (expressed in the unit tex, i.e., the weight of a yarn in gram per 1000 m length) of the yarns arranged in the cross machine direction in the top fabric may vary widely. The linear density of the yarns arranged in the cross machine direction in the top fabric of the screen may be at least 20 tex, preferably at least 40 tex, more preferably at least 50 tex, to ensure a sufficiently strong connection in the top fabric. Preferably, the linear density of the yarns arranged in the cross machine direction in the top fabric of the screen is at most 200 tex, preferably at most 100 tex, more preferably at most 75 tex, to ensure that the top fabric remains sufficiently flexible.

Preferably, the yarns arranged in the cross machine direction in the top fabric are modacryl yarns to further improve the transfer of moisture through the top fabric of the screen and to further improve the fire retardancy of the screen.

The top fabric of the screen may comprise two different types of yarns arranged in the cross machine direction in the top fabric. The first type of yarn arranged in the cross machine direction in the top fabric is preferably located on the lower surface of the top fabric. The first type of yarn arranged in the cross machine direction in the top fabric preferably is a yarn having a black appearance, or colour, to absorb penetrating light. The first type of yarn arranged in the cross machine direction in the top fabric may comprise a black pigment, such as for example carbon black, preferably in amount of 1 wt. % to 10 wt. %, more preferably in amount of 2 wt. % to 5 wt. %, based on the total weight of the first type of yarn, such that the yarns on the lower surface of the top fabric have a black appearance. Alternatively, the first type of yarn arranged in the cross machine direction in the top fabric may be dyed such that the first type of yarn has a black appearance. Preferably, the first type of yarns arranged in the cross machine direction in the top fabric are modacryl yarns to allow transfer of moisture through the top fabric of the screen and to further improve the fire retardancy of the screen.

The second type of yarn arranged in the cross machine direction in the top fabric is preferably located on the upper surface of the top fabric, i.e., facing the roof of the greenhouse. The second type of yarn arranged in the cross machine direction in the top fabric preferably is a yarn having a white appearance, or colour, to reflect light. The second type of yarn arranged in the cross machine direction in the top fabric may comprise a white pigment, such as for example Titanium-dioxide ($TiO_2$), preferably in amount of 1 wt. % to 10 wt. %, more preferably in amount of 2 wt. % to 5 wt. %, based on the total weight of the second type of yarn, such that the yarns on the upper surface of the top fabric have a white appearance. Preferably, the second type of yarns arranged in the cross machine direction in the top fabric are modacryl yarns to allow transfer of moisture through the top fabric of the screen and to further improve the fire retardancy of the screen.

Preferably, the first type of yarn arranged in the cross machine direction in the top fabric are arranged in alternating relationship with the second type of yarn arranged in the cross machine direction in the top fabric.

The linear density of the first type of yarn arranged in the cross machine direction in the top fabric and the linear density of the second type of yarn arranged in the cross machine direction in the top fabric may differ. Preferably, the ratio of the linear density of the first type of yarn arranged in the cross machine direction in the top fabric and the linear density of the second type of yarn arranged in the cross machine direction in the top fabric is at most 2.5, preferably at most 2, more preferably at most 1.75, most preferably at most 1.5. Preferably, the ratio of the linear density of the first type of yarn arranged in the cross machine direction in the top fabric and the linear density of the second type of yarn arranged in the cross machine direction in the top fabric is at least 0.4, preferably at least 0.5, more preferably at least 0.6, most preferably at least 0.65.

Preferably, the first type of yarn arranged in the cross machine direction in the top fabric and the second type of yarn arranged in the cross machine direction in the top fabric have essentially equal linear density to allow the fabric to have a balanced construction. Essentially, equal linear density is understood to mean that the linear density (expressed in the unit tex, i.e., the weight of a yarn in gram per 1000 m length), of the first type of yarn arranged in the cross machine direction differs by at most 10%, preferably by at most 5%, more preferably by at most 2.5%, from the linear density of the second type of yarn arranged in the cross machine direction.

The linear density (expressed in the unit tex, i.e., the weight of a yarn in gram per 1000 m length) of the first type of yarns and of the second type of yarns arranged in the cross machine direction in the top fabric may vary widely. The linear density of the first type of yarns and of the second type of yarns arranged in the cross machine direction in the top fabric of the screen may be at least 20 tex, preferably at least 40 tex, more preferably at least 50 tex, to ensure a sufficiently strong connection in the top fabric. Preferably, the linear density of the first type of yarns and of the second type of yarns arranged in the cross machine direction in the top fabric of the screen is at most 200 tex, preferably at most 100 tex, more preferably at most 50 tex, to ensure that the top fabric remains sufficiently flexible.

Preferably, the yarns arranged in the machine direction in the top fabric and the first type (and optionally second type) of yarns arranged in the cross machine direction in the top fabric have essentially equal linear density to allow the fabric to have a balanced construction.

The top fabric may have a weight, as determined according to EN ISO 9864, in the range of 50 $g/m^2$, to 250 $g/m^2$, preferably in the range of 100 $g/m^2$ to 200 $g/m^2$, more preferably in the range of 125 $g/m^2$ to 175 $g/m^2$, to provide low light transmission and sufficient flexibility.

Preferably, the top fabric of the screen does not comprise polyester yarns arranged in the machine direction of the top fabric as it has been observed that the presence of polyester yarns arranged in the machine direction of the top fabric reduced the fire retardancy of the screen.

Preferably, the top fabric of the screen does not comprise polyester yarns arranged in the cross machine direction of the top fabric as it has been observed that the presence of polyester yarns arranged in the cross machine direction of the top fabric reduced the fire retardancy of the screen.

The polyolefin tapes comprised in the bottom fabric may comprise any type of polyolefin polymer, including polypropylenes, such as for example atactic polypropylene, isotactic polypropylene or syndiotactic polypropylene, and polyethylenes, such as for example low density polyethylene (LDPE), linear low density polyethylene (LLDPE), high density polyethylene (HDPE), and/or copolymers and/or blends thereof. The polyolefin tapes comprised in the bottom fabric comprise preferably high density polyethylene to achieve an optimum balance of costs, durability and stiffness of the bottom fabric and to improve the fire retardancy of the screen.

The synergistic fire resistance composition, as comprised in the polyolefin tapes comprised in the bottom fabric of the screen, comprises a mixture of at least two chemical compounds selected from a phosphonate compound, a diphosphonate compound and/or an alkyl- or arylphosphonic acid, and one or more 1,3,5-triazine compounds.

The synergistic fire resistance composition, as comprised in the polyolefin tapes arranged in the machine direction of the bottom fabric of the screen preferably comprises at least 2.5 wt. %, preferably at least 5 wt. %, preferably at least 7 wt. %, based on the total weight of the polyolefin tapes, of a mixture of at least two chemical compounds, each chemical compound being selected from a phosphonate compound, a diphosphonate compound and/or an alkyl- or arylphosphonic acid and at least 0.2 wt. %, preferably at least 0.5 wt. %, preferably at least 0.7 wt. %, based on the total weight of the polyolefin tapes, of one or more 1,3,5-triazine compounds to improve the fire retardancy of the screen.

The synergistic fire resistance composition, as comprised in the polyolefin tapes arranged in the cross machine direction of the bottom fabric of the screen preferably comprises at least 2.5 wt. %, preferably at least 5 wt. %, preferably at least 7 wt. %, based on the total weight of the polyolefin tapes, of a mixture of at least two chemical compounds, each chemical compound being selected from a phosphonate compound, a diphosphonate compound and/or an alkyl- or arylphosphonic acid and at least 0.2 wt. %, preferably at least 0.5 wt. %, preferably at least 0.7 wt. %, based on the total weight of the polyolefin tapes, of one or more 1,3,5-triazine compounds to improve the fire retardancy of the screen.

Preferably, the synergistic fire resistance composition, as comprised in the polyolefin tapes arranged in the machine direction and/or arranged in the cross machine direction of the bottom fabric of the screen, comprises the total of all the phosphonate, diphosphonate and/or alkyl- or arylphosphonic acid compounds and the total of all the 1,3,5-triazine compounds in a weight ratio of at least 2, preferably at least 5, more preferably at least 7. Preferably, the synergistic fire resistance composition, comprises the total of all the phosphonate, diphosphonate and/or an alkyl- or arylphosphonic acid compounds and the total of all the 1,3,5-triazine compounds in a weight ratio of at most 20, preferably at most 15, more preferably at most 10, to further improve the fire retardancy of the screen.

The synergistic fire resistance composition comprised in the polyolefin tapes of the bottom fabric of the screen preferably comprises dimethylspirophosphonate.

The synergistic fire resistance composition comprised in the polyolefin tapes of the bottom fabric of the screen preferably comprises a methane phosphonic acid, an ethane phosphonic acid or a propane phosphonic acid, or a derivative therereof, such as a salt or ester thereof.

The synergistic fire resistance composition comprised in the polyolefin tapes of the bottom fabric preferably comprises Aflammit® PCO 900, as sold by Thor GmbH. The Aflammit® PCO 900 comprises 24% Phosphor, has a melting point of approx. 245° C. and is suitable for processing up to 270-280° C. Polyolefin polymers as comprised in the polyolefin tapes of the bottom fabric of the screen are suitable to be processed below 270° C., and are thus capable of being processed into tapes together with the Aflammit® PCO 900 synergistic fire resistance composition.

The synergistic fire resistance composition comprised in the polyolefin tapes of the bottom fabric preferably comprises a N-alkoxy hindered amine, preferably Flamestab® NOR 116, as sold by BASF.

The bottom fabric of the screen may comprise polyolefin tapes arranged in the machine direction, preferably parallel to each other, to facilitate installation of the screen into the greenhouse and/or to allow opening and closing of the screen to allow sunlight to enter the greenhouse if desired.

The bottom fabric of the screen may comprise polyolefin tapes arranged in the cross machine direction, preferably parallel to each other, to reduce the amount of light penetrating through the screen.

In an embodiment, the bottom fabric of the screen comprises polyolefin tapes arranged in the machine direction and polyolefin tapes arranged in the cross machine direction to further reduce the amount of light penetrating through the screen.

The polyolefin tapes may have a thickness of 250 µm or less, preferably 200 µm or less, preferably 150 µm or less, more preferably 100 µm or less, most preferably 50 µm or less, to ensure that the bottom fabric remains sufficiently flexible. Preferably, the polyolefin tapes may have a thickness of 10 µm or more, preferably 15 µm or more, preferably 20 µm or more, more preferably 30 µm or more, to ensure good processing of the tapes into the bottom fabric.

The polyolefin tapes may have a width of at least 0.1 cm, preferably at least 0.15 cm, more preferably at least 0.2 cm, to obtain sufficient surface coverage in the bottom fabric under economic conditions. Preferably, the polyolefin tapes have a width of at most 2 cm, preferably at most 1.5 cm, preferably at most 1 cm, more preferably at most 0.5 cm, most preferably at most 0.3 cm, to ensure that the bottom fabric remains flexible enough to allow easy installation of the screen.

The bottom fabric of the screen may further comprise yarns arranged in the machine direction of the bottom fabric to further facilitate installation of the screen into the greenhouse and/or to allow opening and closing of the screen to allow sunlight to enter the greenhouse if desired.

Preferably, the yarns arranged in the machine direction in the bottom fabric are arranged in alternating relationship with the polyolefin tapes arranged in the machine direction in the bottom fabric.

Preferably, the yarns arranged in the machine direction in the bottom fabric are modacryl yarns to allow transfer of moisture through the bottom fabric of the screen and to further improve the fire retardancy of the screen.

The bottom fabric may have a weight, as determined according to EN ISO 9864, in the range of 50 $g/m^2$, to 250 $g/m^2$, preferably in the range of 75 $g/m^2$ to 200 $g/m^2$, more preferably in the range of 100 $g/m^2$ to 150 $g/m^2$, to provide low light transmission and sufficient flexibility.

Preferably, the bottom fabric of the screen does not comprise polyester yarns arranged in the machine direction of the bottom fabric as it has been observed that the presence of polyester yarns arranged in the machine direction of the bottom fabric reduced the fire retardancy of the screen.

Preferably, the bottom fabric of the screen does not comprise polyester yarns arranged in the cross machine direction of the bottom fabric as it has been observed that the presence of polyester yarns arranged in the cross machine direction of the bottom fabric reduced the fire retardancy of the screen.

Preferably, the bottom fabric of the screen does not comprise polyester tapes arranged in the machine direction of the bottom fabric as it has been observed that the presence of polyester tapes arranged in the machine direction of the bottom fabric reduced the fire retardancy of the screen.

Preferably, the bottom fabric of the screen does not comprise polyester tapes arranged in the cross machine direction of the bottom fabric to further improve the fire retardancy of the screen.

Preferably, the polyolefin tapes arranged in the machine direction, and optionally the yarns arranged in the machine direction, and the polyolefin tapes arranged in the cross machine direction of the bottom fabric are woven into a woven fabric forming the bottom fabric of the screen.

The weave pattern of the bottom fabric may be selected by the person skilled in the art. Preferably, the weave pattern of the top fabric is a plain 1/1 weave pattern.

Preferably, the woven fabric forming the bottom fabric has a weave construction such that an essentially full surface coverage is obtained by the bottom fabric to reduce light transmission through the screen. Preferably, the light transmission through the bottom fabric is 5% or less, preferably 2% or less, more preferably 1 or less, more preferably 0.5% or less, most preferably 0.1% or less.

Preferably, the polyolefin tapes, preferably arranged in the machine direction in the bottom fabric of the screen, and optionally the yarns arranged in the machine direction in the bottom fabric, are arranged in direct contact with the neighbouring polyolefin tapes and/or neighbouring yarns to reduce the amount of light penetrating through the screen.

Preferably, the polyolefin tapes, preferably arranged in the cross machine direction in the bottom fabric of the screen, are arranged in direct contact with the neighbouring polyolefin tapes to reduce the amount of light penetrating through the screen.

The top fabric and the bottom fabric in the screen may be connected to each other to form an integrated screen. Connection of the top fabric and the bottom fabric fibers to each other can be performed by any known suitable process, including by use of an adhesive such as or example a glue and/or a hot melt, by mechanical bonding processes such as for example stitching or mechanical needling, or by thermal bonding.

Preferably, the screen comprises the top fabric and the bottom fabric as two separate layers, i.e., not connected to each other, preferably oriented plane parallel to each other, more preferably directly adjacent to each other, to ensure that the screen remains sufficiently flexible and to further improve the fire retardancy of the screen.

Preferably, the light transmission through the screen is 5% or less, preferably 2% or less, more preferably 1% or less, more preferably 0.5% or less, most preferably 0.1% or less.

Although not being bound by theory, it is believed that the combination of the woven structure of the bottom and/or the top fabric and the synergistic fire resistance composition comprised in the polyolefin tapes in the bottom fabric enables the screen to fulfil the requirements of the NTA 8825:2010 fire test.

EXAMPLE 1

A screen was prepared comprising two separate fabrics, a top fabric and a bottom fabric.

The top fabric comprises in the machine direction 3.6 tapes comprised of PVC laminated with aluminum foil per cm width, alternated with 3.6 black modacryl yarns per cm width, type Kanecaron KDCY10 having a linear density of 57 tex, woven into a fabric with two types of modacryl yarns in the cross machine direction, each in an amount of 2.5 yarns per cm length. The weave pattern is a plain 1/1 pattern.

The first type of modacryl yarn in the cross machine direction is white yarn, type Kanecaron PW having a linear density of 66 tex. The second type of modacryl yarn in the cross machine direction is black yarn, type Kanecaron KDCY10 having a linear density of 66 tex. The first type of modacryl yarn in the cross machine direction and the second type of modacryl yarn in the cross machine direction are woven into the fabric in an alternating relationship. The white Kanecaron PW yarns are located on the upper surface of the top fabric. The black Kanecaron KDCY10 yarns are located on the lower surface of the top fabric. The aluminum foil in the top fabric faces upwards. The PVC tapes comprise carbon black.

The top fabric has a weight of 144 g/m$^2$ and a light transmission of 0.15%.

The bottom fabric comprises in the machine direction (MD) 3.80 black HDPE tapes per cm width alternated with 3.80 black modacryl yarns per cm width, type Kanecaron KDCY10 having a linear density of 57 tex, woven into a fabric with 3.50 black HDPE tapes per cm length in the cross machine direction (CMD). The HDPE tapes were prepared by extruding a mixture of 77 wt. % of HDPE, type Eltex A4009, 8 wt. % masterbatch containing carbon black, and 15 wt. % masterbatch comprising synergistic fire resistance composition. The HDPE tapes comprised 7.5 wt. % of synergistic fire resistance composition comprising Thor PCO 900 and a 1,3,5-triazine compound in a 9 to 1 weight ratio.

The bottom fabric has a weight of 108 g/m$^2$ and a light transmission of 0.02%.

COMPARATIVE EXAMPLE

A sample of XLS OBSCURA REVOLUX A/B+B/B, as sold by AB Ludvig Svensson, is used as comparative example. The XLS OBSCURA REVOLUX A/B+B/B product comprises two separate fabrics, a top fabric and a bottom fabric.

The XLS REVOLUX A/B top fabric comprises in the machine direction tapes of PVC laminated with aluminum foil, the tapes in the machine direction being warp-knitted together with transparent modacryl yarns arranged in the machine direction and with black polyester (PET) yarns arranged in the machine direction.

The top fabric has a weight of 141 g/m$^2$ and comprises 2.5 tapes per cm width, and yarns per cm width. The top fabric has a light transmission of 0.45%.

The modacryl yarns in the top fabric are of the type Kanecaron PT. The aluminum foil in the top fabric faces upwards. The PVC tapes comprise carbon black.

The XLS REVOLUX B/B bottom fabric comprises in the machine direction black polyester (PET) tapes being warp-knitted together with black polyester (PET) yarns arranged in the machine direction.

The bottom fabric has a weight of 79 g/m$^2$ and comprises 2.4 tapes per cm width, and yarns per cm width. The bottom fabric has a light transmission of 0.03%.

The screen of Example 1 and the sample of the comparative example were tested for fire retardancy in accordance with the NTA 8825:2010 fire test. The test results are summarized in Table 1.

As is clear from the fire test results summarized in Table 1, the screen according to the invention fulfils the requirements of the NTA 8825:2010 fire test, while the XLS OBSCURA REVOLUX A/B+B/B fails to fulfill the requirements. In particular, the fire test on a stack of 3 layers of screen according to the invention, does not deteriorate for the screen of Example 1, where the fire test for the comparative example clearly deteriorates for the stack of 3 layers of screen. Furthermore, the screen of example 1 exhibits improved fire retardant performance in the fire test with stationary flame on single layer of screen at 30°.

TABLE 1

Results of the NTA 8825:2010 fire test.

| | | Example 1 | Comparative Example |
|---|---|---|---|
| NTA 8825 30° 1-layer screen, stationary, 15 sec | Top side; MD | +/++ | +/+ |
| | Bottom side; MD | +/+ | +/+ |
| | Top side; CMD | +/++ | +/+ |
| | Bottom side; CMD | +/+ | +/+ |
| NTA 8825 90°, 1-layer screen, stationary | | + | + |
| NTA 8825 30°, 1-layer screen, following flame | | + | + |
| NTA 8825 30°, 3-layer screen, following flame | | + | − |
| Fire spread | | Class 1 | Class 2 |
| Burning droplets | | dr0 | dr0 |

The invention claimed is:

1. A fire retardant darkening screen for greenhouses, wherein the fire retardant darkening screen comprises a top fabric and a bottom fabric, wherein the top fabric comprises halogen-containing polymeric strips, and a light-reflective film or foil, laminated to at least one of the halogen-containing polymeric strips, wherein the bottom fabric comprises polyolefin tapes, the polyolefin tapes comprising a synergistic fire resistance composition comprising a mixture of at least two chemical compounds, each chemical compound being selected from a phosphonate compound, a di-phosphonate compound and/or an alkyl- or arylphosphonic acid, and at least one 1,3,5-triazine compound.

2. The screen according to claim 1 wherein the bottom fabric comprises the polyolefin tapes in a machine direction and/or in a cross machine direction.

3. The screen according to claim 2 wherein the polyolefin tapes arranged in the machine direction of the bottom fabric comprise at least 2.5 wt. % of a mixture of at least two chemical compounds, each chemical compound being selected from a phosphonate compound, a di-phosphonate compound and/or an alkyl- or arylphosphonic acid, based on the total weight of the polyolefin tapes and at least 0.2 wt. % of one or more 1,3,5-triazine compounds based on the total weight of the polyolefin tapes.

4. The screen according to claim 2 wherein the polyolefin tapes arranged in the cross machine direction of the bottom fabric comprise at most 2.5 wt. % of a mixture of at least two chemical compounds, each chemical compound being selected from a phosphonate compound, a di-phosphonate compound and/or an alkyl- or arylphosphonic acid, based on the total weight of the polyolefin tapes and at most 0.2 wt. % of one or more 1,3,5-triazine compounds based on the total weight of the polyolefin tapes.

5. The screen according to claim 1 wherein the top fabric comprises the halogen-containing polymeric strips in a machine direction.

6. The screen according to claim 1 wherein the top fabric is a woven fabric.

7. The screen according to claim 1 wherein the bottom fabric is a woven fabric.

8. The screen according to claim 1 wherein the light-reflective film or foil is laminated to the at least one of the halogen-containing polymeric strips by a glue.

9. The screen according to claim 1 wherein the top fabric comprises modacryl yarns in a machine direction.

10. The screen according to claim 1 wherein the top fabric comprises modacryl yarns in a cross machine direction.

11. The screen according to claim 10 wherein the top fabric comprises black modacryl yarns in the cross machine direction and white modacryl in the cross machine direction.

12. The screen according to claim 1 wherein the bottom fabric comprises modacryl yarns in a machine direction.

13. The screen according to claim 1 wherein the top fabric does not comprise polyester yarns.

14. The screen according to claim 1 wherein the bottom fabric does not comprise polyester yarns.

* * * * *